United States Patent [19]

Shultz et al.

[11] Patent Number: 5,433,283
[45] Date of Patent: Jul. 18, 1995

[54] APPARATUS FOR CONTROLLING A THROTTLE PLATE OF A CARBURETOR OF AN INTERNAL COMBUSTION ENGINE IN RESPONSE TO LOSS OF TRACTION BY A DRIVING WHEEL, OR OTHER SIMILAR CONDITION

[75] Inventors: Gilbert F. Shultz, Novi; William A. Giovino, West Bloomfield; Taraneh Rahmanifar, Dearborn; Viren Merchant, Canton, all of Mich.

[73] Assignee: SGS-Thomson Microelectronics, Inc., Carrollton, Tex.

[21] Appl. No.: 143,926

[22] Filed: Oct. 27, 1993

[51] Int. Cl.$^6$ .............................................. B60K 31/04
[52] U.S. Cl. ................................ 180/197; 364/426.03; 123/361; 123/399; 318/254
[58] Field of Search .................. 180/197; 364/426.01, 364/426.02, 426.03; 123/361, 399; 251/129.04; 318/254, 696, 685, 439

[56] References Cited

U.S. PATENT DOCUMENTS

| | | | |
|---|---|---|---|
| 4,637,487 | 1/1987 | Nakamura et al. | 180/197 |
| 4,722,411 | 2/1988 | Ohashi et al. | 180/197 |
| 4,768,608 | 9/1988 | Hrovat | 180/197 |
| 4,850,319 | 7/1989 | Imoehl | 123/361 |
| 4,985,836 | 1/1991 | Hashiguchi et al. | 180/197 X |
| 4,985,837 | 1/1991 | Togai et al. | 180/197 X |
| 4,985,838 | 1/1991 | Hashiguchi et al. | 180/197 X |
| 5,003,948 | 4/1991 | Churchill et al. | 123/361 X |
| 5,022,483 | 6/1991 | Tsuyama et al. | 180/197 |
| 5,025,882 | 6/1991 | Ghoneim et al. | 180/197 |
| 5,168,450 | 12/1992 | Ohkubo et al. | 123/361 X |
| 5,183,128 | 2/1993 | Ito et al. | 180/197 |
| 5,199,401 | 4/1993 | O'Neil et al. | 180/197 X |
| 5,222,570 | 6/1993 | Kawamura et al. | 180/197 |
| 5,245,542 | 9/1993 | Itoh et al. | 180/197 X |
| 5,255,192 | 10/1993 | Ito et al. | 180/197 X |
| 5,262,950 | 11/1993 | Nakayama | 180/197 X |
| 5,269,391 | 12/1993 | Ito et al. | 180/197 |

*Primary Examiner*—Margaret A. Focarino
*Assistant Examiner*—F. Zeender
*Attorney, Agent, or Firm*—Richard A. Bachand; Rodney M. Anderson; Lisa K. Jorgenson

[57] ABSTRACT

An apparatus for controlling a throttle of an internal combustion engine of a vehicle receives a signal related to an actual position of the throttle, and a target throttle position signal produced in response to a condition of the vehicle, such as loss of traction of one or more driving wheels. A polyphase motor is connected to control the position of the throttle. A circuit, such as a programmed digital computer, is also provided that is responsive to the target throttle position signal for simultaneously applying driving signals to at least two windings of the polyphase motor to cause the polyphase motor to move the position of the throttle until the signal related to the actual position of the throttle indicates that the throttle is at a position indicated by the target throttle position signal.

18 Claims, 1 Drawing Sheet

APPARATUS FOR CONTROLLING A THROTTLE PLATE OF A CARBURETOR OF AN INTERNAL COMBUSTION ENGINE IN RESPONSE TO LOSS OF TRACTION BY A DRIVING WHEEL, OR OTHER SIMILAR CONDITION

BACKGROUND OF THE INVENTION

1. Field of the Invention

This invention relates to electrical and mechanical apparatus for controlling a throttle plate of a carburetor of an internal combustion engine in response to loss of traction by a driving wheel, or other similar condition, and more particularly, to improvements in such throttle control devices that provides rapid and accurate throttle control, and can be accomplished in a cost effective manner.

2. Relevant Background

Recently, the automotive industry has begun implementing a so-called traction control feature available on modern vehicles. Briefly, a typical traction control device operates to adjust the position of a throttle plate of the carburetor of the internal combustion engine when loss of traction of one of the driving wheels of the vehicle on which the device is implemented loses traction with the road surface. Typically, a second or supplemental throttle plate is employed in the carburetor, and is operated by a stepper motor. The stepper motor is operated in response to a signal indicating that traction is lost by applying stepping pulses to the stepper motor to close the throttle until traction is regained. At the time traction is regained, pulses are applied to the stepper motor in an appropriate way to move the motor in the opposite direction to reopen the throttle.

One of the most serious drawbacks in presently available traction control systems is in their lack of cost effectiveness. The stepper motors are typically motors having 96 poles to enable a reasonable throttle position accuracy to be realized. Such motors are inherently expensive in and of themselves, and require sophisticated circuitry to properly operate.

In addition, the stepper motor systems typically used are open loop, deriving for their positional accuracy from the inherent nature of a stepper motor which moves a predetermined increment with each step. Consequently, for example, if a throttle is desired to be moved between two known positions, a number of stepping pulses are applied to the motor sufficient to move the motor from the first to second position, without a requirement for positional feedback from the throttle. However, it can be seen that if for any reason one or more of the stepping pulses is ineffective to move the stepping motor, the entire system accuracy is lost. Typically most systems are over-designed to compensate for this, and therefore are more expensive to realize.

Moreover, the accuracy of presently used stepper motor systems depends upon the increments in which the motor can be stepped. The stepper motors generally cannot be positioned at positions in between steps. This shortcoming is one of the reasons that stepper motors used in such environments have typically large numbers of poles (for instance 96), in order to increase the positional resolution that can be achieved by the particular motor.

SUMMARY OF THE INVENTION

In light of the above, it is an object of the invention to provide an improved apparatus for controlling a throttle plate of a carburetor of an internal combustion engine of a vehicle, in response to a condition of the vehicle, such as the traction or loss thereof of one of the driving wheels of the vehicle.

It is another object of the invention to provide an improved apparatus of the type described that does not require a stepper motor for controlling the position of the throttle plate, and further to provide such improved apparatus in which the motor can be used as a stepper motor as a fall back mode of operation, for example if a feedback mechanism, or the like, fails.

It is another object of the invention to provide an improved apparatus of the type described that provides improved positional accuracy and control of the throttle plate than traction control devices heretofore advanced.

It is another object of the invention to provide an improved apparatus of the type described that can be implemented in a cost effective manner.

These and other objects, features and advantages will become apparent to those skilled in the art from the detailed description set forth below, when read in conjunction with the accompanying drawing and appended claims.

In accordance with a broad aspect of the invention, an apparatus is provided for controlling a throttle of an internal combustion engine of a vehicle. The apparatus has means for generating a signal related to an actual position of the throttle, and means for providing a target throttle position signal in response to a condition of the vehicle. A polyphase motor is connected to control the position of the throttle. Means is also provided that is responsive to the target throttle position signal for simultaneously applying driving signals to at least two windings of the polyphase motor for causing the polyphase motor to move the position of the throttle until the signal related to the actual position of the throttle indicates that the throttle is at a position indicated by the target throttle position signal.

The means responsive to the target throttle position signal for simultaneously applying driving signals to at least two windings of the polyphase motor comprises a programmed digital computer or the like, which provides driving signals to a plurality of MOSFET devices connected to respective coils of the polyphase motor to control driving currents therein.

The means for providing a target throttle position signal in response to a condition of the vehicle may comprises a circuit for providing a signal having a duty cycle that varies in accordance with the condition of the vehicle, for example, that provides a signal having a duty cycle that varies in accordance with a signal indicating loss of traction of driving wheels of the vehicle.

BRIEF DESCRIPTION OF THE DRAWING

The invention is illustrated in the accompanying drawing, in which.

DETAILED DESCRIPTION OF THE PREFERRED EMBODIMENTS

Figure 1:
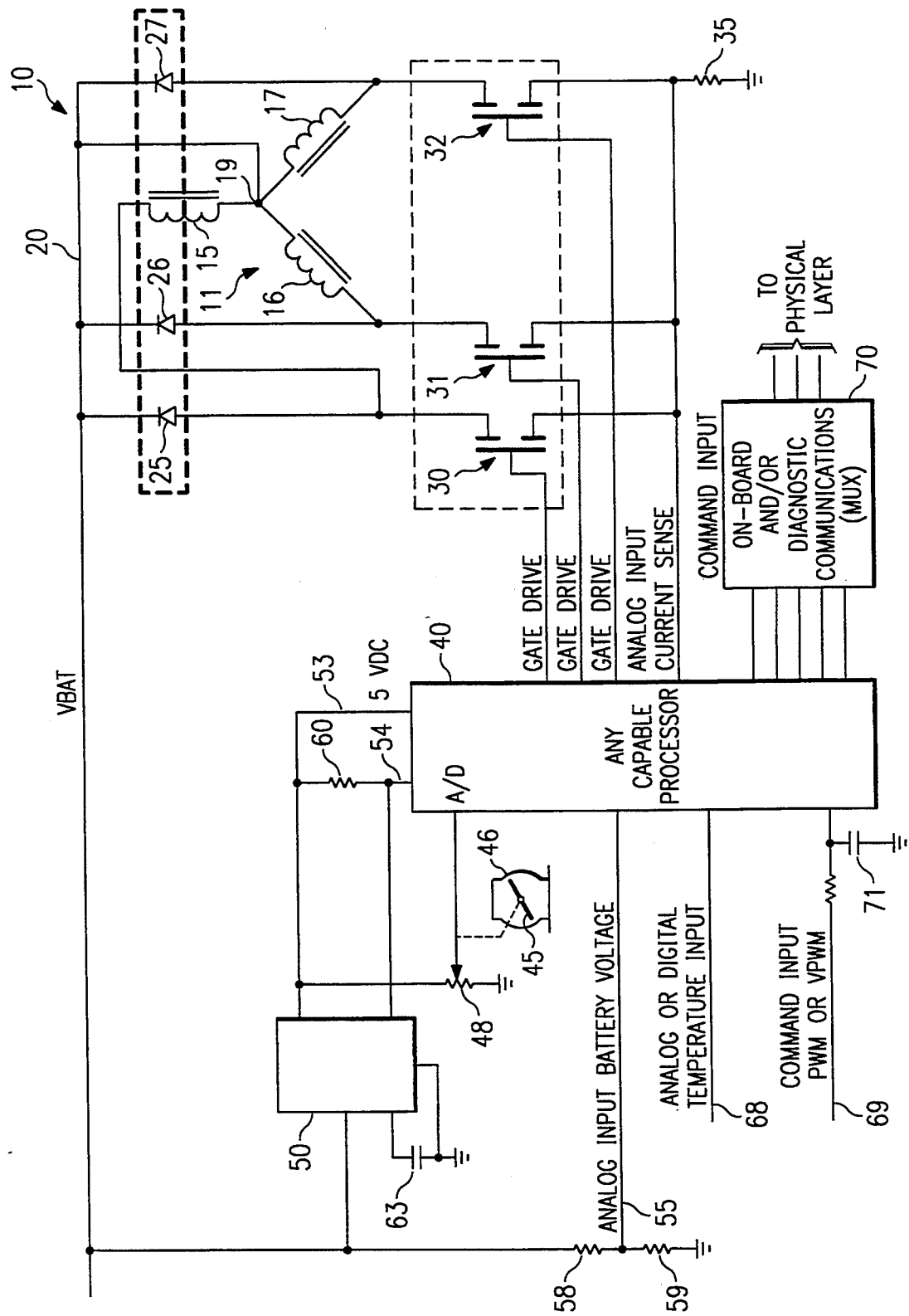
FIG. 1 is an electrical schematic diagram of an apparatus for controlling a throttle of an internal combustion engine of a vehicle, in accordance with the invention.

The invention can be realized using simple, light weight, polyphase dc motors, although the use of such is not absolutely necessary. The motor function can be provided, for example, by currently used stepper motors, by polyphase motors that employ brushes in their commutation, or by other motors with appropriate circuit modifications.

The apparatus of the invention realizes the positional accuracy of the throttle controlling motor by virtue of the ability to fully or partially energize selectively one or more coils of the stator of the motor in order to position the rotor of the motor at virtually any desired location. Furthermore, positional feedback from a rheostat or potentiometer associated with the throttle plate is employed as a feedback signal to assure that the precise desired throttle position is obtained.

More particularly, and in accordance with the invention, as shown in FIG. 1, a circuit 10 is provided for operating a polyphase dc motor that is connected to a throttle plate of a carburetor of an internal combustion engine of a vehicle on which the system is employed. While the circuit does not require a stepper motor for controlling the position of the throttle plate, nevertheless, the motor can be used as a stepper motor as a fall back mode of operation, for example if a feedback mechanism, or the like, fails. Although the preferred embodiment described is directed to use in positioning a throttle plate of a carburetor of an internal combustion engine of a vehicle, it will be appreciated that the circuit 10 can be used for controlling the mechanical position of any similarly positionable item. Thus, one application for which the circuit 10 and motor 11 are suited is, for example, in the control of a throttle of a carburetor of an internal combustion engine or the like, and more particularly, to the control of the position of a butterfly valve of such carburetor. One application in which such butterfly valve control may be useful, for example, is in conjunction with known circuitry for controlling the carburetor upon the occurrence of an event, such as the loss of traction of the driving wheels of the vehicle on which the device is used.

The motor 11 can be of any suitable kind, for example, polyphase brushless SENSORLESS motors, variable reluctance motors, switched variable reluctance stepper motors, or the like. The motor characteristics have an impact on the response time and the torque and output and position accuracy that can be achieved, and, the particular application in which the motor is used may dictate the type of motor that can be used. In the example shown, the motor is a three-phase motor having stator coils 15-17 interconnected in a "Y" configuration. The coils 15-17 are interconnected at a center tap node 19 that is connected to a battery or voltage supply line 20. Additionally, the ends of the coils 15-17 distally located from the center tap connection are likewise optionally connected to the battery or supply voltage line 20 by respective clamping diodes 25, 26, and 27. The distal ends of the coils 15-17 are additionally connected to the drain elements of the FET power devices 30, 31, and 32, respectively. The transistors 30-32 can be, for example, MOSFET devices, or other suitable switching device, depending on the particular application in which the circuit is employed. The source elements of the transistor devices 30-32 are connected to a sense resistor 35 that is connected to a reference potential or ground, as shown. The sense resistor 35 can be of size determined by the particular application to which the circuit is employed.

The gate drive signals to the transistors 30-32 are provided by a microcontroller, microprocessor, or the like. Intermediate drive circuits and or level/translators can be employed between the microcontroller 40 and gates of the respective transistors 30-32, if desired. In the embodiment shown, the microcontroller 40 shown, may be, for instance, of the type sold by SGS-THOMSON Microelectronics, Inc. designated ST9030, or the like. The ST9030 microcontroller may have an EPROM memory included on the chip that may include the program steps, below described, for the operation of the circuit. The gate drive lines to each of the transistors 30-32 can be connected to appropriate output pins from the microcontroller 40 to provide appropriate drive signals to the respective coils 15-17 of the motor 11. The position of a butterfly valve 45 of a carburetor 46 is connected to a potentiometer 48 to provide a voltage to the A to D input of the microcontroller 40 that depends upon the rotational position of the butterfly valve 45.

Various other circuitry can be employed, as necessary. For example, the power supply to the microcontroller 40 can be provided by a voltage regulator 50 which can be, for instance, of type L4947 also sold by SGS-THOMSON Microelectronics, Inc. of Carrollton, Tex. Outputs from the voltage regulator 50, in addition to providing a voltage on the resistor 48 that can be tapped for butterfly valve position indicating input to the processor 40 as described .above, may include the voltage supply on lines 53 and 54 as well as an analog voltage input on line 55. The analog input battery voltage can be monitored, for example, by an optional voltage divider that includes resistors 58 and 59, or the like. This information can be used by the algorithm, below described, for changes in battery voltage to compensate the motor drive to maintain proper performance. A reset pullup resistor 60 may additionally be provided, if required by the particular application. Also, the L4947 voltage regulator may have an external capacitor 63 connected to appropriate input terminals to establish or determine the reset time of the device.

One of the features of the ST9030 microcontroller is that it has a capability of accepting an analog or digital temperature input signal that may be provided on line 68, if desired. A command input signal may be provided on input line 69 to provide a PWM or VPWM signal, as needed. Finally, if desired, a number of output connections from the microcontroller 40 can be used to provide on-board or diagnostic multiplexed communications to provide warnings or other operating indicia externally of the system, the diagnostics and communications function being denoted by the box 70 in FIG. 1.

The general operation of the circuit 10 is derived from the position feedback developed to indicate the rotational position of the butterfly valve 45 of the carburetor 46. It should be noted that although an analog signal is developed to indicate the rotational position of the butterfly valve 45, a digital signal could alternatively be developed and applied to digital input terminals of the microcontroller 40. When a command input is received on line 49 indicating a desired butterfly valve position, the microcontroller 40 determines the difference, if any, between the desired position and the actual position of the butterfly valve 45. If a positional difference exists, it is considered an error, and, from the amount of error, a new position is determined and the motor 11 operated to drive the motor to the new desired position. It is noted that the microcontroller 40 is programmed to assure that a calculated position is never greater than or equal to the command position to ensure that the loop gain of the circuit is always less than one so that the controller circuit does not oscillate.

The sense input provided by the sense resistor 35 can be used to detect variations in the resistance of the coils 15-17 to enable compensation to be implemented, if desired.

It will be appreciated that by virtue of the motor position control provided by the microcontroller 40, the motor 11 can be microstepped. A microstep is a step less than one step ordinarily provided by the stepper motor, and can be effected by controlling the current relationship between two selected coils of the motor 11. Thus, although ordinarily the motor 11 is stepped by incrementally changing the application of drive pulses from the power transistors 30-32 one at a time, if the pulses applied to the windings 15-17 are adjusted to provide ratioed pulses to two selected coils at one time, the motor can be incrementally stepped in less than one full step increments. Thus, for example, disregarding external influences, if it is desired to position the pole of the motor one-half of the way between coils 15 and 16, the current passed through coil 15 is established to generate 50% of the magnetic field applied to the motor pole and the current through coil 16 is adjusted to provide 50% of the magnetic force on the pole. Of course, as the distance from the poles varies, the magnetic force varies accordingly. By virtue of the feedback provided by the actual position of the butterfly valve 45, the precise current ratio necessary to bring the motor to the desired position can be accurately established. Moreover, the controller 40 is capable of generating a polyphase output that can be used to drive the power transistors 30-32 in a PWM mode of operation, if desired.

In operation, a base time period is chosen for a PWM signal that is applied to the command line 69. The percentage of the asserted or ON time of the command signal is translated to indicate a desired target position. Then, as mentioned, the microcontroller 40 compares this command with the actual position determined by the position feedback sensor. A pulldown resistor (not shown) may be internally provided within the microcontroller 40 on the command input line 69, and, in addition, depending upon the operating voltages, voltage divider resistors (also not shown) may be provided in parallel with the filter capacitor 71 to establish a desired input voltage level to the microcontroller 40, for example in a 12 volt system.

During the operation of the motor, the duration of the driving pulses applied to the respective coils 15-17 can be controlled by the onboard timers of the microcontroller 40. If desired, for example, a value can be loaded into a register of the microcontroller 40 that indicates the desired count that would be reached if a pulse were to be delivered in a predetermined number of clock pulses of the frequency of the clock pulses of the microcontroller 40. If desired, a second register can contain an overflow value whereby if the clock pulses reach the overflow value, an error signal can be generated to indicate a malfunction of the circuit.

For microstepping of the motor, described above, first and second counters can be employed to count to respective counts necessary to apply the desired RMS current ratio to two selected coils of the motor to effect intermediate steps, in virtually any desired precision.

As mentioned above, the microcontroller 40 can be controlled by a sequence of operating steps of a program that can be impressed upon or loaded into an onboard or external program memory. The program steps can be arranged to provide the following functions from the microcontroller 40. It should be noted that the motor 11 has two characteristics that must be considered in its operation and the programming steps provided by the program. The first is the inertia of the motor that must be overcome in accelerating or braking the motor. Thus, if a braking force were applied to the motor, the motor would not be able to instantaneously stop, but would continue to run after the breaking command were applied. The second and related factor that must be considered is the braking force itself that is applied to the motor to bring it to a halt at the desired position. Thus, for precision, the speed of the motor, inertia of the load, construction of the motor, and other such factors, must be controlled and taken into consideration upon braking to enable the motor to stop at the precise desired position. This is taken into account, for example, in step (a)(i) in the program described below.

By using the algorithm outlined above, and described below in detail, the precise position of the rotor of the motor 11 can be brought to virtually any desired position within the range of rotation allowed. Thus, the motor position of the motor that controls the position of the throttle butterfly valve can be controlled by an algorithm loaded into the microcontroller. More particularly, the algorithm is initiated by an interrupt in the microcontroller 40 that is initiated in response to the control signal on line 69 that can be generated upon detection of a predetermined condition, such as actuation of a signal upon detection of a skid loss of traction, or the like. The program then performs the following:

a. COMPARE the present position of the motor (and, therefore the position of the butterfly valve of the carburetor) with the desired motor position.
  i. CALCULATE the motor position if the motor were to decelerate to zero velocity at this time.
b. IF the motor has stopped AND the desired portion has not been achieved THEN
  i. SET desired direction
  ii. GOTO step e. ELSE remain at rest
c. IF the calculated position of the rotor after braking is less than or equal to the desired target position, indicating that the motor will stop at or before the target position THEN
  i. Start (or continue) deceleration
  ii. GOTO step g.
d. IF the calculated position of the rotor after braking is greater than the desired target position, indicating that the motor will not stop at or before the target position THEN
  i. Start (or continue) deceleration
  ii. GOTO step b.
e. Accelerate the motor velocity GOTO step c.
g. Return from the interrupt.

The deceleration calculation in this example is based upon an acceleration-deceleration curve that assumes a linear ramp-up and ramp down, the curve being developed from the manner in which the braking of the motor stops the motor. Other ramp-up and ramp-down waveforms may exist in other applications, depending upon the factors listed above. Thus, in the present example, the ratio of the present position and the deceleration slope determines the final stopping position of the motor.

It will be appreciated that although the invention has been described in conjunction with controlling a rotational position of a butterfly valve of a ,carburetor of an internal combustion engine upon loss of traction of a driving wheel of the vehicle, it may find application for other suitable similar uses. For example, the position of a primary butterfly valve of an internal combustion engine can be electronically or remotely controlled for control of the internal combustion engine by a remote operator. Alternatively, in the event of a catastrophic failure of a critical component, the butterfly valve can be controlled to throttle down the internal combustion engine to operate at less than a predefined RPM. An example of such use may be, for example, in governors or other engine speed controlling apparatuses. In such cases, the feedback control of the butterfly valve position can be controlled so that an overall vehicle speed can be limited, yet attained, for instance, upon particular vehicle load conditions, such as hill climbing or the like. Other such uses and modifications will be apparent to those skilled in the art.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. Apparatus for controlling a throttle of an internal combustion engine of a vehicle, comprising:
   means for generating a signal related to an actual position of the throttle;
   means for providing a target throttle position signal in response to a condition of the vehicle;
   a polyphase motor having a plurality of windings, and connected to control the position of the throttle; and
   means responsive to the target throttle position signal for simultaneously applying ratioed driving signals to first and second ones of the plurality of windings of said polyphase motor, with the ratioed driving signals corresponding to a position indicated by the target throttle position signal.

2. The apparatus of claim 1 wherein said signal related to an actual position of the throttle is a d-c voltage signal.

3. The apparatus of claim 1 wherein said means for generating a signal related to an actual position of the throttle is a rheostat connected to the throttle and a voltage source to produce a variable dc voltage proportional to the position of the throttle.

4. The apparatus of claim 1 wherein said means responsive to the target throttle position signal for simultaneously applying driving signals to at least two windings of said polyphase motor comprises a programmed digital computer.

5. The apparatus of claim 4 wherein said means responsive to the target throttle position signal for simultaneously applying ratioed driving signals to first and second ones of the plurality of windings of said polyphase motor comprises a plurality of MOSFET devices controlled by said programmed digital computer and connected to respective ones of the plurality of windings of said polyphase motor to control driving currents therein.

6. The apparatus of claim 1 wherein said polyphase motor is a polyphase dc motor.

7. The apparatus of claim 1 wherein said polyphase motor is a brushless polyphase dc motor.

8. The apparatus of claim 1 wherein said polyphase motor is a brushless and SENSORLESS polyphase dc motor.

9. The apparatus of claim 1 wherein said means for providing a target throttle position signal in response to a condition of the vehicle comprises a circuit for providing a signal having a duty cycle that varies in accordance with the condition of the vehicle.

10. The apparatus of claim 9 wherein the vehicle is powered by a plurality of driving wheels;
    and wherein said circuit for providing a signal having a duty cycle that varies in accordance with the condition of the vehicle provides a signal indicating loss of traction of one or more of the plurality of driving wheels of the vehicle.

11. Apparatus for controlling a throttle of an internal combustion engine of a vehicle in response to a signal indicating loss of traction of a driving wheel of the vehicle, comprising:
    a first signal generator for producing an actual position signal related to an actual position of the throttle;
    a second signal generator for providing a target throttle position signal in response to the signal indicating loss of traction;
    a polyphase motor, having a plurality of windings, and connected to control the position of the throttle; and
    a controller circuit for:
      comparing the actual position signal to the target throttle position signal;
      responsive to the actual position signal differing from the target throttle position signal, calculating a target motor position of the polyphase motor corresponding to the target throttle position signal; and
      responsive to the calculated target motor position and the target throttle position signal, applying driving signals simultaneously to two of the plurality of windings of said polyphase motor to cause said polyphase motor to change the position of the throttle until the actual position signal indicates that the throttle is at the target position.

12. The apparatus of claim 11 wherein said actual position signal is a d-c voltage signal.

13. The apparatus of claim 11 wherein said first signal generator is a rheostat connected to the throttle and a voltage source to produce a variable dc voltage proportional to the position of the throttle.

14. The apparatus of claim 11 wherein said controller circuit comprises a programmed digital computer.

15. The apparatus of claim 14 wherein said controller circuit further comprises a plurality of MOSFET devices controlled by said programmed digital computer and connected to respective ones of the plurality of windings of said polyphase motor to control driving currents therein.

16. The apparatus of claim 11 wherein said polyphase motor is a polyphase dc motor.

17. The apparatus of claim 11 wherein said polyphase motor is a brushless polyphase dc motor.

18. The apparatus of claim 11 wherein said polyphase motor is a brushless and SENSORLESS polyphase dc motor.

* * * * *